United States Patent [19]
Ghelberg et al.

[11] Patent Number: 5,157,651
[45] Date of Patent: Oct. 20, 1992

[54] APPARATUS AND METHOD FOR DETERMINING LINE RATES

[75] Inventors: Emil Ghelberg, Cheshire; Patrick A. Evans, Southington; Seng P. Lee, Chesire; Don W. Liyanage, Waterbury, all of Conn.

[73] Assignee: General DataComm, Inc., Middlebury, Conn.

[21] Appl. No.: 558,701

[22] Filed: Jul. 26, 1990

[51] Int. Cl.[5] .............................................. H04J 3/14
[52] U.S. Cl. ........................................ 370/13; 370/84; 370/110.1; 370/112; 375/10; 375/121
[58] Field of Search .................. 370/84, 100.1, 102, 370/105.1, 105.3, 105.4, 105.5, 106, 110.1, 112, 13; 375/10, 97, 116, 118, 119, 120, 121; 341/61; 331/1 R, 1 A, 18, 25; 455/67

[56] References Cited
U.S. PATENT DOCUMENTS

| | | | |
|---|---|---|---|
| 3,995,119 | 11/1976 | Pachynski, Jr. | 370/112 |
| 4,025,720 | 5/1977 | Pachynski, Jr. | 370/102 |
| 4,215,245 | 7/1980 | Bellisio | 370/84 |
| 4,418,322 | 11/1983 | Chang | 331/1 A |
| 4,547,877 | 10/1985 | Lehman et al. | 370/84 |
| 4,566,099 | 1/1986 | Magerl | 370/84 |
| 4,745,601 | 5/1988 | Diaz et al. | 370/84 |
| 4,815,136 | 3/1989 | Benvenuto | 381/43 |
| 4,949,339 | 8/1990 | Shimada et al. | 370/84 |

Primary Examiner—Douglas W. Olms
Assistant Examiner—Alpus H. Hsu
Attorney, Agent, or Firm—David P. Gordon

[57] ABSTRACT

Apparatus and methods for automatically determining the bit rate of an incoming signal are provided. The apparatus includes a counter, a logic circuit, and a histogram generating circuit. The counter counts the number of fast reference clock cycles which fit within each pulse of the incoming signal for a statistically significant number of pulses and provides indications thereof to the logic circuit. The logic circuit associates each of the indications with one of a plurality of allowable bit rates. The histogram generating circuit tracks the numbers of times the counts are associated with each allowable bit rate. In one embodiment, the allowable bit rate most often chosen is determined to be the bit rate of the incoming signal. In another embodiment, if a DDS1 line rate is determined to be the bit rate most often chosen, the DDS2 rate associated with the DDS1 line rate is provisionally selected. Also, if a DDS2 line is determined to be the bit rate most often chosen, that DDS2 line rate is provisionally selected. Then a frame pattern detector is used to detect the DDS/SC frame pattern. If a frame pattern is detected, the DDS2 rate provisionally selected is determined to be the bit rate of the incoming signal; if not, the DDS1 line rate associated with the DDS2 provisionally selected is chosen.

20 Claims, 2 Drawing Sheets

APPARATUS AND METHOD FOR DETERMINING LINE RATES

BACKGROUND OF THE INVENTION

This invention broadly relates to data communications bit rate determining apparatus. The invention more particularly relates to apparatus and methods for automatically determining the bit rate of incoming signals and for determining when the bit rate has switched, when any of a plurality of bit rates may be received.

Various techniques have been used in data communication devices for determining the bit rate of an incoming signal where any of a plurality of data bit rates are to be accommodated, but the data rate is not previously known to the receiving apparatus. One technique, is to measure the pulse width of the incoming signal utilizing a much faster reference clock signal. By counting the number of reference clock cycles which fit within the incoming signal, a determination of the frequency of the incoming signal is made. Such a technique is effective as long as all permissible data rates are substantially different. However, where two data rates are close, due to jitter, the pulse which is measured may mistakenly appear to be the pulse of a clock signal at one rate when it actually is based on the second rate.

Phase locked loops are also used for measuring the rate of an incoming signal. Phase locked loops however, are most effective for monitoring and tracking small changes in signal rates. Where harmonics are involved (e.g. possible rates of 2400, 4800, 9600 bits/second), the phase locked loop is often ineffective, as a phase locked loop which is locked to a first frequency cannot detect a harmonic thereof which is by definition in phase therewith.

SUMMARY OF THE INVENTION

It is therefore an object of the invention to provide methods and apparatus for automatically determining the bit rate of incoming signals.

It is another object of the invention to provide methods and apparatus for distinguishing among incoming signals of similar rates.

It is a further object of the invention to provide methods and apparatus for distinguishing among DDS1 and DDS2 type signals.

It is an additional object of the invention to provide methods for determining when the connection of a receiving apparatus has been changed to a different line type and/or a different rate.

In accord with the objects of the invention an apparatus for automatically determining the bit rate of an incoming signal broadly comprises: counting means for counting the number of reference clock cycles which fit within each pulse of the incoming signal for a statistically significant number of pulses to provide a statistically significant number of counts; logic means coupled to the counting means for associating each of said statistically significant number of counts to one of a plurality of allowable bit rates; and means coupled to the logic means for tracking the numbers of times the counts are associated with each allowable bit rate; i.e. means for generating a histogram. In one embodiment, the allowable bit rate most often chosen as indicated by the histogram is determined to be the bit rate of the incoming signal. In another embodiment, if a DDS1 line rate is determined to be the bit rate most often chosen, the DDS2 rate associated with the DDS1 line rate is provisionally selected. Also, if a DDS2 line rate is determined to be the bit rate most often chosen, that DDS2 line rate is provisionally selected. In that embodiment, the apparatus further includes frame pattern detection means for detecting a DDS/SC frame pattern. If a frame pattern is detected, the DDS2 rate provisionally selected is determined to be the bit rate of the incoming signal. On the other hand, if a frame pattern is not detected, the DDS1 line rate which was chosen most often or which is associated with the DDS2 rate chosen most often is determined to be the bit rate.

Another preferred aspect of the invention includes a phase locked loop for determining whether a line rate or line type has been changed. If the phase locked loop loses its phase lock, a microprocessor or the like restarts the counting means so that a rate determination can be made. Preferably, the microprocessor also serves as the means for tracking the number of times the counts are associated with the bit rates.

Additional objects and advantages of the invention will become evident to those skilled in the art upon reference to the detailed description taken in conjunction with the provided figures.

DETAILED DESCRIPTION OF THE PREFERRED EMBODIMENTS

Figure 1:
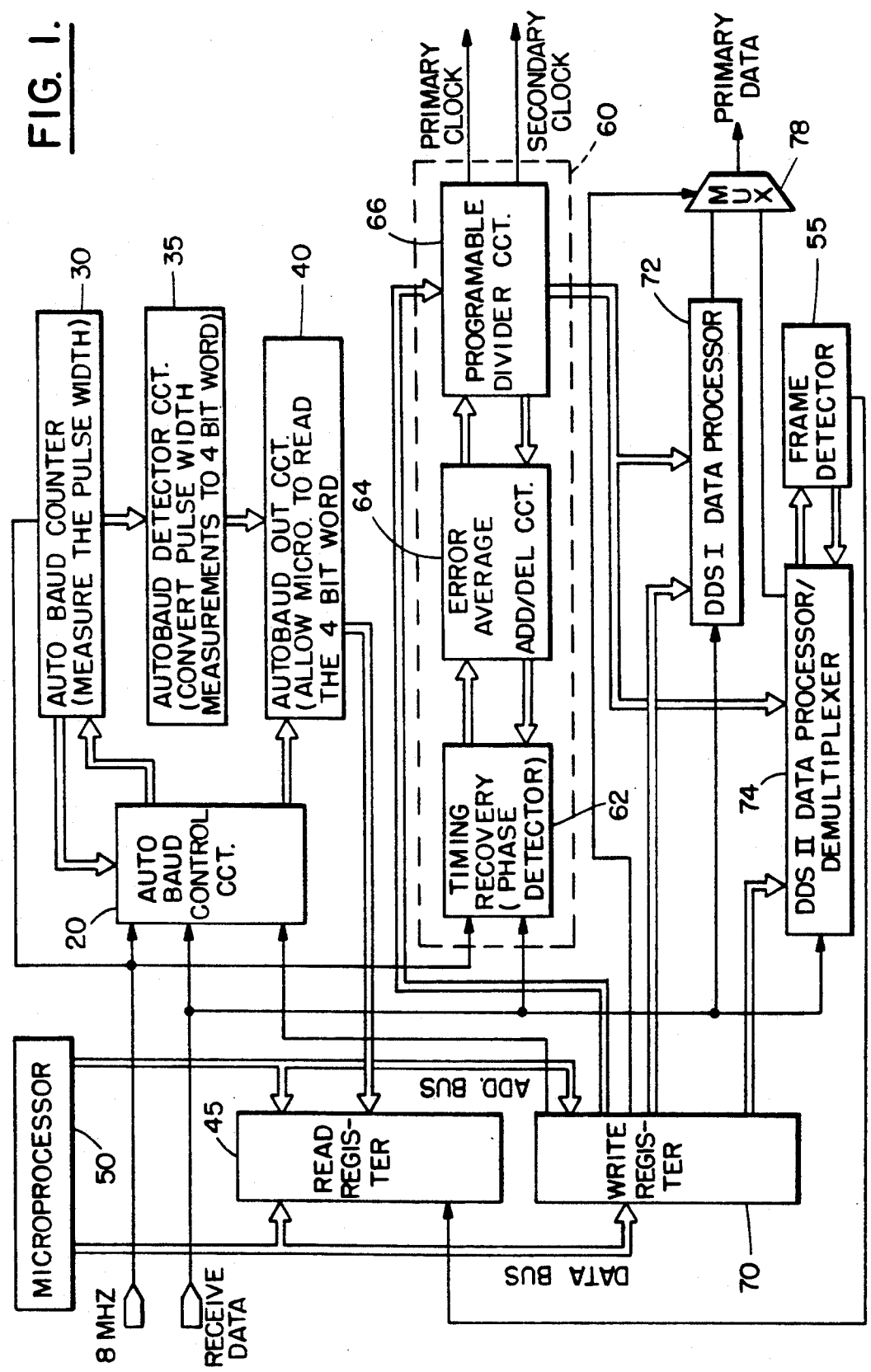
FIG. 1 is a block diagram of a portion of a DDS data receiving means.

Before turning to FIG. 1, it should be appreciated that while the invention is shown with particular application to a DDS data receiving means, the applicability of the invention is much broader.

Specifications for a DDS data receiving means are set forth in Publication 62310 published by AT&T as a Technical Reference, and entitled "Digital Data System Channel Interface Specifications", November 1987. As set forth in Publication 62310 and updates thereto, various channel speeds, with and without secondary channel service are possible. In particular, primary channel data rates (DDS1 service) include 2.4K, 4.8K, 9.6K, 19.2K, and 56K. Where secondary channels are added to the primary rates, DDS2 rates of 3.2K, 6.4K, 12.8K, 25.6K, and 72K result. In all, ten different rates are presently available.

It is the function of the receiving part of a DDS apparatus to interface DDS1 or DDS2 telephone lines carrying data to the equipment of a user. The receiving functions of the DDS apparatus generally include: receive clock recovery; frame recovery; data demultiplexing; state decoding (i.e. data state, idle state, and control state); and diagnostics. Only the receive clock recovery, frame recovery, and data demultiplexing are discussed herein as being relevant.

Turning to FIG. 1, the portions of a DDS data receiving means 10 which conduct receive clock recovery, frame recovery, and data demultiplexing are seen. In particular, for purposes of clock recovery, incoming data from a DDS1 or DDS2 line ("Receive Data") is sent to a control circuit 20 which also receives an 8.064 MHz fast reference clock. The control circuit 20 includes a plurality of DQ flip-flops (not shown) and other logic gates (not shown), and generates control signals therefrom, including a counter start control, and counter stop control, a clear decoder control, and a clear register control. The counter start and stop controls are effectively generated by using one or more of the DQ flip-flops (not shown) with the incoming data applied to the D input, and the 8.064 MHz clock as the clock input. In this manner, at the first rising edge of the 8.064 MHz clock after a data pulse is received (or at some set delay thereafter), the DQ flip-flop will provide a counter start control signal, and at the first rising edge of the 8.064 MHz clock after the data pulse has finished (or at the set delay thereafter), the DQ flip-flop will provide a counter stop control signal.

The counter start and counter stop control signals are sent to the counter circuit 30 which is also coupled to the fast reference clock. The counter circuit 30 counts the number of fast reference clock pulses which occur between the counter start and counter stop signals received from the control circuit. Upon completion of counting, an eleven bit count is forwarded from the counter circuit 30 to a decoder circuit 35, and the count of the counter circuit 30 is cleared.

The decoding of the counter circuit count by the decoder 35 is preferably accomplished as follows. The ideal numbers of 8.064 MHz clock pulses which would be counted in 2.4K, 3.2K, 4.8K, 6.4K, 9.6K, 12.8K, 19.2K, 25.6K, 56K, and 72K bit/second DDS pulses are previously determined. Midway between the ideal number of pulses for any two DDS rates, a hypothetical line is drawn. If the number of 8.064 MHz clock pulses counted by the counting circuit 30 is greater than the number at which the hypothetical line is drawn, the lower rate is selected by the decoder 35. If the number of counted clock pulses is less than or equal to the number at which the hypothetical line is drawn, the higher rate is selected by the decoder. Chart I sets forth which counts are associated with which rates:

CHART I

| COUNTS | RATE | COUNTS | RATE |
|---|---|---|---|
| >1440 | 2.4K | 253–360 | 12.8K |
| 1009–1440 | 3.2K | 181–252 | 19.2K |
| 721–1008 | 4.8K | 100–180 | 25.6K |
| 505–720 | 6.4K | 64–99 | 56K |
| 361–504 | 9.6K | <64 | 72K |

Having associated the count with a line rate, the decoder 35 generates a four bit code which represents the line rate. The four bit code is provided to a buffer circuit 40.

The buffer circuit 40 is provided so that the four bit code from the decoder 35 can be read into read registers 45 and then cleared by the control circuit 20. The read registers 45 are used by a microprocessor 50 to conduct a histogram of the line rates at which the pulses of the received data appear to be coming. In other words, a count is made of the number of times each of the four bit codes are received in the read registers. After the width of a statistically significant number (e.g. 100) of data pulses has been measured by the counter circuit 30, and appropriate count has been made of the line rates at which they appear to be coming, a decision is made by the microprocessor 50 as to the line rate of the incoming signal. According to one preferred embodiment, the microprocessor 50 chooses the line rate which occurred most often, and information regarding that rate is forwarded to the demultiplexing section of the receiver circuitry as hereinafter described. According to another preferred embodiment, the choice made by the microprocessor as to the line rate is made in accord with other information. If the line rate indicated by the histogram is a DDS1 line rate, the DDS2 line rate associated with that DDS1 line rate is provisionally selected. Then the microprocessor checks to see (via read registers 45) whether the standard frame recovery circuit 55 has detected a DDS/SC frame pattern. If a frame pattern is detected, the DDS2 rate provisionally selected is determined to be the bit rate of the incoming signal. On the other hand, if a frame pattern is not detected, the DDS1 line rate which occurred most often is determined to be the bit rate of the incoming signal. Similarly, if the line rate indicated by the histogram is a DDS2 line rate, that DDS2 line rate is provisionally selected. If a frame pattern is detected, the DDS2 line rate is confirmed. If no frame pattern is detected, the DDS1 line rate associated with the DDS2 rate chosen most often is finally chosen.

The determined DDS1 or DDS2 line rate information is sent by the microprocessor 50 to a digital fixed bandwidth phase locked loop (DPLL) 60 of the receive circuitry of the DDS apparatus. The DPLL 60 includes a phase detector 62, an error average circuit 64, and a programmable divider circuit 66 and has a frequency transfer characteristic like that of a narrow-band high Q, bandpass filter. Frequencies above and below the DPLL passband are greatly attenuated, and the DPLL produces a highly stable, low jitter output clock which frequency and phase locked to the recovered data.

The programmable divider circuit 66 divides the 8.064 MHz clock by a preset modulus as determined by the microprocessor 50 based on the line rate as determined by the microprocessor. The programmable divider circuit 66 obtains the preset modulus information via the write registers 70 as discussed hereinafter. The center frequency of the primary clock signal generated by the divider circuit 66 is fed back to the phase detector 62 which also receives the incoming data. The phase detector compares the two signals and generates a time varying phase error which is used by the error average circuit 64 to temporarily increment or decrement the divide modulus in such a way as to force phase error to a minimum. As a result, the programmable divider circuit 66 generates a primary clock, and where necessary a secondary clock which are locked within a small range around desired center frequencies.

Information from the programmable divider circuit 66 is used in conjunction with the data demultiplexing aspect of the DDS data receiving apparatus. In the preferred embodiment, the incoming data is written to both the DDS1 data processor 72 and the DDS2 data processor and demultiplexer 74. Where the incoming data is DDS1 data, the DDS1 data processor combines the RX+ and RX− data portions, and if desired, conducts violation and zero suppression detections. The data is then passed through mux 78 as primary channel data, with the control of mux 78 handled by the write registers 70. Where the incoming data is DDS2 data, the RX+ and RX− data portions are combined, and the primary channel data and secondary channel data are demultiplexed. The primary channel data is then forwarded via mux 78 as the primary channel data, and the secondary channel data is output as secondary channel data as indicated.

As aforementioned, the write registers 70 are under control of the microprocessor 50. The write registers are used to control the multiplexer 78, enable or disable various functions within the DDS1 data processor 72 and the DDS2 data processor and demultiplexer 74, as well to enable or disable the control circuit 20 and thereby the associated counter 30, decoder 35 and buffer 40. The write registers 70 are further used to set the programmable divider 66 of the phase locked loop 60. Thus, control lines between the write registers 70 and the control circuit 20, the programmable divider 66, the DDS1 data processor 72, the DDS2 data processor and demultiplexer 74, and the multiplexer 78 are shown.

Figure 2:
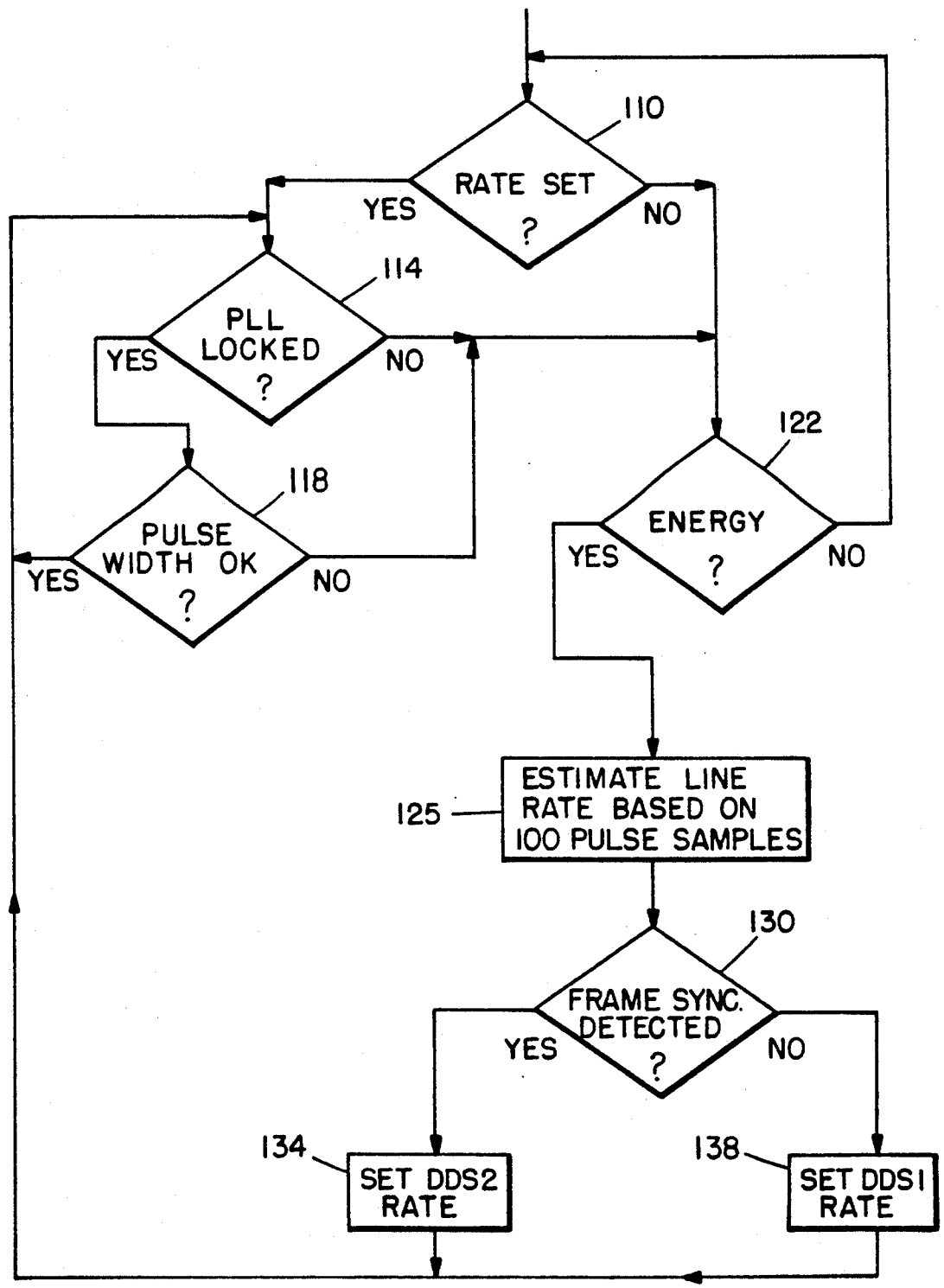
FIG. 2 is a high level flow chart of the preferred method invention as carried out by the microprocessor of the DDS data receiving means of FIG. 1.

The method invention for automatically determining the line rate of an incoming signal is seen in FIG. 2. At 110 a determination is made as to whether the line rate has already been determined. If yes, the phase locked loop is checked at 114 to see whether it is appropriately locked. If it is locked, if desired, several (e.g. 10) pulse widths of incoming pulses may be checked at 118 to see if a majority correlate to the line rate which is expected. If yes, steps 114 and 118 are repeated, until either the phase locked loop is no longer locked, or too many pulses of different widths are sensed.

If at step 110, a determination is made that the line rate has not already been determined, or if at steps 114 or 118 the phase locked loop is not locked or too many pulses of different widths are sensed, the method goes to step 122 where a determination is made as to whether there is energy on the line. If not, the method returns to step 110 and cycles through steps 110 and 122, or 110, 114, and 122, until energy is sensed. Then, the line rate is estimated at step 125 by utilizing the circuitry of FIG. 1 for a statistically significant number of incoming pulses. As aforedescribed, in one embodiment, the line rate estimated at step 125 is set as the line rate; but in a second embodiment the DDS2 rate estimated, or the DDS2 rate associated with the DDS1 rate estimated is chosen as the preliminary estimate and additional determinations are made. Thus, in FIG. 2, the line rate estimate of step 125 is a preliminary or provisional determination, and a determination is made at step as to whether frame synchronization has been detected by the frame sync detection means. If frame synchronization is detected at step 130, the DDS2 rate provisionally selected at step 125 is set as the line rate at step 134. If frame synchronization is not detected at step 130, the DDS1 rate associated with the DDS2 rate provisionally selected at step 125 is set as the line rate at step 138.

Once the line rate is set at either step 134 or step 138, the method returns to step 114 to check whether the phase locked loop is locked. If desired, if a DDS2 rate has been selected, another step (not shown) which determines whether frame synchronization has been lost can be added in lieu of, or in addition to the optional step 118.

There have been described and illustrated herein methods and apparatus for determining line rates. While particular embodiments have been set forth, it should be appreciated by those skilled in the art that it is intended that the invention be as broad in scope as the art will allow and that the specifications be read likewise. Thus, while the invention was described with particular reference to DDS lines, it will be appreciated that the invention applies to any situation where different line rates must be distinguished. Further, while particular circuitry for carrying out the invention was described, it will be appreciated that numerous different circuits will present themselves to those skilled in the art. All that is required is that the a fast clock be used to estimate the length of the incoming pulses, that the incoming pulse lengths be divided into different groups or buckets representing different possible rates, and that some means for conducting a histogram be provided, whether the histogram conducting means be a microprocessor, a plurality of voltage accumulators, or a plurality of counters. Also, while the preferred method and apparatus utilize one hundred pulse samples from which to make a rate determination, it will be appreciated that the number of samples utilized can vary depending on the circumstances. All that is required, is that the number of samples be statistically significant considering the proximity of the rates, the rate of the fast clock, the noise which corrupts the incoming signal and the accuracy which is desired. In fact, if desired, rather than checking the phase locked loop/or and the synchronization (where a DDS2 rate is chosen) in order to determine whether the line rate or line type has changed, a continuous determination of line rate may be made by taking successive groups of pulses and conducting successive histograms. Therefore, it will be apparent to those skilled in the art that additional modifications can be made to the described invention without deviating from the scope and spirit of the invention as so claimed.

For the purposes of this application, the term DDS1 is used to refer to standard digital data service (DDS), while the term DDS2 is used to refer to digital data service with secondary channel (DDS/SC).

We claim:

1. An apparatus utilizing a fast reference clock for automatically determining the bit rate of an incoming signal, where the bit rate of the incoming signal is at any one of a plurality of allowable bit rates, and the incoming signal includes a plurality of pulses, comprising:
    a) counting means for counting for each pulse of the incoming signal the number of reference clock cycles which together approximate the length of the pulse of the incoming signal, for a statistically significant number of pulses to provide a statistically significant number of counts;
    b) logic means counting means for associating each of said statistically significant number of counts to one of said plurality of allowable bit rates; and
    c) histogram generating means coupled to the logic means for tracking the numbers of times said counts are associated with each said allowable bit rate.

2. An apparatus according to claim 1, further comprising:
    d) means for determining the bit rate having the most counts associated therewith, said means for determining coupled to said histogram generating means, wherein said bit rate having the most counts associated therewith is nominally said bit rate of said incoming signal.

3. An apparatus according to claim 2, further comprising:
    e) phase locked loop means including an adjustable divider circuit means and phase comparison means, said adjustable divider circuit means being coupled to said means for determining the bit rate so as to provide a nominal primary clock output, and said phase comparison means being coupled to said adjustable divider circuit means for comparing the phase of said reference clock with the phase of said incoming signal and causing said adjustable divider circuit means to change said nominal primary clock output accordingly to provide a primary clock output.

4. An apparatus according to claim 3, wherein:
said incoming signal is one of a DDS1 and a DDS2 signal.

5. An apparatus according to claim 2, wherein:
said incoming signal is one of a DDS1 and a DDS2 signal.

6. An apparatus according to claim 1, wherein said incoming signal is one of a DDS1 and a DDS2 signal each DDS1 and DDS2 signal having a respective bit rate, and each DDS1 signal is associated with a DDS2 signal, said apparatus further comprising:

d) means for determining the bit rate having the most counts associated therewith, said means for determining coupled to said histogram generating means, wherein when a bit rate having the most counts associated therewith is a bit rate of a particular DDS1 signal, the bit rate of the DDS2 signal associated with said particular DDS1 signal is provisionally selected as the rate of said incoming signal by said means for determining the bit rate, and when a bit rate having the most counts associated therewith is a bit rate of a particular DDS2 signal, the bit rate of that particular DDS2 signal is provisionally selected as the rate of said incoming signal by said means for determining the bit rate.

7. An apparatus according to claim 6, further comprising:

e) frame pattern detection means for receiving said incoming signal and detecting a DDS/SC frame therein, said frame pattern detection means being coupled to said means for determining the bit rate, wherein when said frame pattern detection means detects a DDS/SC frame in said incoming signal, said DDS2 signal provisionally selected as the rate of said incoming signal is finally selected as the rate of said incoming signal by said means for determining the bit rate, and when said frame pattern detection means fails to detect a DDS/SC frame in said incoming signal, the DDS1 signal associated with said DDS2 signal provisionally selected is finally selected as the rate of said incoming signal by said means for determining the bit rate.

8. An apparatus according to claim 7, further comprising:

f) phase locked loop means including an adjustable divider circuit means and phase comparison means, said adjustable divider circuit means being coupled to said means for determining the bit rate so as to provide a nominal primary clock output, and said phase comparison means being coupled to said adjustable divider circuit means for comparing the phase of said reference clock with the phase of said incoming signal and causing said adjustable divider circuit means to change said nominal primary clock output accordingly to provide a primary clock output.

9. An apparatus according to claim 8, wherein:
said adjustable divider circuit means further provides a secondary clock output.

10. An apparatus according to claim 9, further comprising:

g) a demultiplexer means for receiving said incoming signal and demultiplexing said incoming signal when said incoming signal is a DDS2 signal into a primary data signal associated with said primary clock output and a secondary data signal associated with said secondary clock output.

11. An apparatus according to claim 7, further comprising:

f) a demultiplexer means for receiving said incoming signal and demultiplexing said incoming signal when said incoming signal is a DDS2 signal into a primary data signal and a secondary data signal.

12. A method for automatically determining the bit rate of an incoming signal by utilizing a fast reference clock, where the bit rate of the incoming signal is at any one of a plurality of allowable bit rates, and the incoming signal includes a plurality of pulses, comprising:

a) counting, for each pulse of the incoming signal and for a statistically significant number of pulses of said incoming signal, the number of reference clock cycles which together approximate the length of the pulse of the incoming signal, and providing therefrom a statistically significant number of counts;

b) associating each of said statistically significant number of counts to one of said plurality of allowable bit rates; and c) tracking the numbers of times said counts are associated with each said allowable bit rate.

13. A method according to claim 12, further comprising:

d) determining the allowable bit rate having the most counts associated therewith, wherein said bit rate having the most counts associated therewith is nominally said bit rate of said incoming signal.

14. A method according to claim 13, further comprising:

e) applying said nominal bit rate to a phase locked loop circuit and providing therefrom a nominal primary clock output, based on said nominal bit rate; and f) comparing the phase of said reference clock with the phase of said incoming signal and causing said phase locked loop circuit to change said nominal primary clock output accordingly to provide a primary clock output.

15. A method according to claim 14, further comprising:

g) monitoring said phase locked loop circuit to determine whether it is locked, and if it is not locked repeating steps a) through f).

16. A method according to claim 12, wherein said incoming signal is one of a DDS1 and a DDS2 signal each DDS1 and DDS2 signal having a respective bit rate, and each DDS1 signal is associated with a DDS2 signal, said method further comprising:

d) determining the bit rate having the most counts associated therewith, wherein when a bit rate having the most counts associated therewith is a bit rate of a particular DDS1 signal, the bit rate of the DDS2 signal associated with said particular DDS1 signal is provisionally selected as the rate of said incoming signal by said means for determining the bit rate, and when a bit rate having the most counts associated therewith is a bit rate of a particular DDS2 signal, the bit rate of that particular DDS2 signal is provisionally selected as the rate of said incoming signal by said means for determining the bit rate.

17. A method according to claim 16, further comprising:

e) providing said incoming signal to a frame pattern detection means, and attempting to detect a DDS/SC frame in said incoming signal, wherein when said frame pattern detection means detects a DDS/SC frame in said incoming signal, said DDS2 signal provisionally selected as the rate of said incoming signal is finally selected as the rate of said incoming signal, and when said frame pattern detection means fails to detect a DDS/SC frame in said incoming signal, the DDS1 signal associated with said DDS2 signal provisionally selected is finally selected as the rate of said incoming signal.

18. A method according to claim 17, further comprising:
   f) applying said nominal bit rate to a phase locked loop circuit and providing therefrom a nominal primary clock output based on said nominal bit rate, and
   g) comparing the phase of said reference clock with the phase of said incoming signal and causing said phase locked loop circuit to change said nominal primary clock output accordingly to provide a primary clock output.

19. A method according to claim 18, wherein said adjustable divider circuit further provides a secondary clock output, said method further comprising:
   h) demultiplexing said incoming signal when said incoming signal is a DDS2 signal into a primary data signal associated with said primary clock output and a secondary data signal associated with said secondary clock output.

20. A method according to claim 19, further comprising:
   i) monitoring said phase locked loop circuit to determine whether it is locked, and if it is not locked repeating steps a) through g).

* * * * *